(12) United States Patent
Nagamine

(10) Patent No.: US 8,156,349 B2
(45) Date of Patent: Apr. 10, 2012

(54) ELECTRONIC DEVICE AND INTERFACE SYSTEM

(75) Inventor: Hiroto Nagamine, Yokohama (JP)

(73) Assignee: Nikon Corporation, Tokyo (JP)

( * ) Notice: Subject to any disclaimer, the term of this patent is extended or adjusted under 35 U.S.C. 154(b) by 658 days.

(21) Appl. No.: 11/987,373

(22) Filed: Nov. 29, 2007

(65) Prior Publication Data

US 2008/0133802 A1 Jun. 5, 2008

(30) Foreign Application Priority Data

Dec. 5, 2006 (JP) ................................. 2006-328228

(51) Int. Cl.
*G06F 1/00* (2006.01)

(52) U.S. Cl. ...................................................... 713/300

(58) Field of Classification Search .................. 713/300, 713/330, 340; 710/301, 303
See application file for complete search history.

(56) References Cited

U.S. PATENT DOCUMENTS

| | | | | |
|---|---|---|---|---|
| 5,884,086 | A * | 3/1999 | Amoni et al. ................. | 713/300 |
| 6,072,304 | A * | 6/2000 | Duve ............................ | 323/239 |
| 6,283,789 | B1 * | 9/2001 | Tsai .............................. | 439/502 |
| 6,671,814 | B1 | 12/2003 | Kubo et al. | |
| 7,028,126 | B1 * | 4/2006 | Liang ........................... | 710/301 |
| 7,043,646 | B2 * | 5/2006 | Enami et al. .................. | 713/300 |
| 7,356,715 | B2 * | 4/2008 | Okayasu ....................... | 713/300 |
| 7,455,229 | B2 * | 11/2008 | Tanaka ..................... | 235/462.01 |
| 7,541,692 | B2 * | 6/2009 | Hirst et al. ...................... | 307/44 |
| 7,750,939 | B2 | 7/2010 | Kobayashi et al. | |
| 7,853,141 | B2 * | 12/2010 | Kikugawa ..................... | 396/301 |
| 2005/0036034 | A1 * | 2/2005 | Rea et al. .................. | 348/207.1 |
| 2007/0040894 | A1 * | 2/2007 | Kikugawa ................. | 348/14.01 |
| 2007/0196099 | A1 * | 8/2007 | Ishiyama et al. .............. | 396/301 |
| 2008/0150512 | A1 * | 6/2008 | Kawano ........................ | 323/351 |

FOREIGN PATENT DOCUMENTS

| | | |
|---|---|---|
| JP | A-2000-105638 | 4/2000 |
| JP | A-2002-237972 | 8/2002 |
| JP | A 2005-025405 | 1/2005 |
| JP | A-2006-293306 | 10/2006 |

OTHER PUBLICATIONS

Digi. Using Powered USB with Standard PCs. Application Note. Oct. 10, 2003.*
Intel Corporation. Power Delivery Design Issues for Hi-Speed USB on Motherboards. 2002.*
Maxim. USB On-The-Go Basics. Application Note 1822. Dec. 20, 2002.*
Apr. 12, 2011 Office Action issued in Japanese Patent Application No. 2006-328228 with Translation.
Nov. 29, 2011 Office Action issued in Japanese Patent Application No. 2006-328228 (with translation).

* cited by examiner

*Primary Examiner* — Matthew Spittle
(74) *Attorney, Agent, or Firm* — Oliff & Berridge, PLC

(57) ABSTRACT

An electronic device, comprising a USB connector through which another electronic device is connected to the electronic device; and a power supply circuit that supplies power from a power source to the other electronic device via a specified pin other than a power supply pin of the USB connector.

11 Claims, 3 Drawing Sheets

ELECTRONIC DEVICE AND INTERFACE SYSTEM

INCORPORATION BY REFERENCE

The disclosure of the following priority application is herein incorporated by reference:
Japanese Patent Application No. 2006-328228 filed Dec. 5, 2006

BACKGROUND OF THE INVENTION

1. Field of the Invention

The present invention relates to an electronic device connected through a USB (universal serial bus) interface.

2. Description of Related Art

The USB is known widely as an interface through which a personal computer and its peripheral devices are connected. A first device equipped with a USB host controller and a second device equipped with a USB device controller are typically connected through the USB interface. While the power is normally supplied from the first device to the second device via the USB connection, there are technologies known in the related art that allow power to be supplied from the second device to the first device as well (see, for instance, Japanese Laid Open Patent Publication No. 2005-25405).

SUMMARY OF THE INVENTION

In a USB system adopting a technology in the related art that allows power to be supplied from the second device functioning as a USB device to the first device functioning as a USB host, the power supply is carried out via a supply line at the USB interface. This gives rise to a concern that if the first device has a power supply function as well, interference may occur with the power sources of both devices connected to the supply line.

An electronic device according to the present invention comprises: a USB connector through which another electronic device is connected to the electronic device; and a power supply circuit that supplies power from a power source to the other electronic device via a specified pin other than a power supply pin of the USB connector.

An electronic device according to another invention comprises: a USB device controller; a USB connector through which an electronic device equipped with a USB host controller is connected to the electronic device; and a power supply circuit that supplies power from a power source to the electronic device equipped with the USB host controller via a specified pin other than a power supply pin of the USB connector.

In the electronic device according to the another invention, the specified pin is an identifier pin of the USB connector and the power supply circuit supplies power to the electronic device equipped with the USB host controller via the identifier pin. It is preferred that the power supply circuit includes a switching device that connects the power source with the identifier pin and disconnects the power supply from the identifier pin.

A control unit that issues a switch instruction to the switching device can control the switching device to connect the power source with the identifier pin and disconnect the power supply from the identifier pin. The electronic device further comprises: an operation member that enables a menu operation to be performed to select a use/nonuse setting for the electronic device equipped with the USB host controller connected via the USB connector. The control unit issues the switch instruction to the switching device once use of the electronic device equipped with the USB host controller is allowed through the menu operation performed via the operation member.

An electronic device according to yet another invention comprises: a USB host controller; a USB connector through which an electronic device equipped with a USB device controller is connected to the electronic device; and a power supply circuit to which power is supplied from the electronic device equipped with the USB device controller via a specified pin other than a power supply pin of the USB connector.

In the electronic device according to the yet another invention, the specified pin is an identifier pin of the USB connector; and power is supplied to the power supply circuit via the identifier pin. The identifier pin and the power supply pin are connected with each other.

In the electronic device according to the yet another invention, the power supply circuit includes a voltage converter that lowers or boosts a voltage supplied via the identifier pin and the voltage resulting from conversion at the voltage converter is applied to the power supply pin.

An interface system according to the present invention comprises a first electronic device and a second electronic device. The first electronic device comprises a USB device controller; a USB connector through which the second electronic device equipped with a USB host controller is connected to the first electronic device; and a power supply circuit that supplies power from a power source to the second electronic device equipped with the USB host controller via a specified pin other than a power supply pin of the USB connector. The second electronic device comprises a USB host controller; a USB connector through which the first electronic device is connected to the second electronic device; and a power supply circuit that supplies power from the first electronic device equipped with the USB device controller via a specified pin other than a power supply pin of the USB connector. The first electronic device can be an electronic camera, equipped with blocks engaged in photographing processing such as an imaging optical system, an imaging sensor that captures an image of a subject, an image processing unit that executes image processing on an imaging signal output from the imaging sensor, a memory, an operation member and a recording medium; and the second electronic device can be a wireless LAN module.

DESCRIPTION OF PREFERRED EMBODIMENTS

Figure 1:
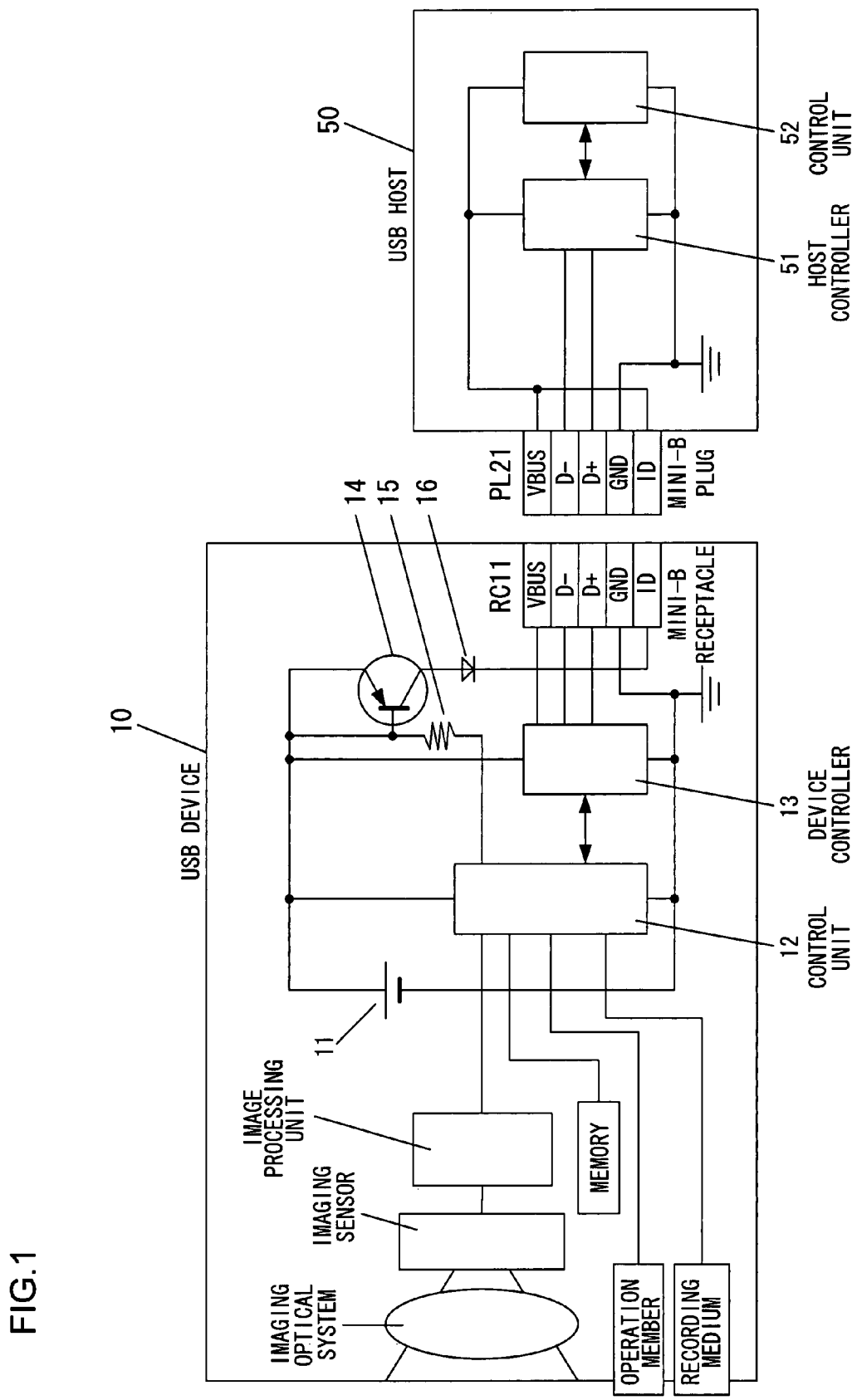
FIG. 1 illustrates the interface system achieved in a first embodiment of the present invention.

FIG. 1 illustrates the interface system achieved in the first embodiment of the present invention. The interface system shown in FIG. 1 includes a plurality of electronic devices each equipped with a USB connector in compliance with the USB (universal serial bus) specification which is set forth by the USB Implementers Forum (USB-IF). In the embodiment, a USB device 10 and a USB host 50 are directly connected with each other through the USB connectors without using a cable and power is supplied from the USB device 10 to the USB host 50.

The USB device 10 may be, for instance, an electronic camera, whereas the USB host 50 may be a wireless LAN module. By directly connecting the wireless LAN module 50 to the electronic camera 10 via the USB connectors, image data accumulated in the electronic camera 10 can be directly transferred to a server or the like on a network without having to transmit the image data via a personal computer or the like.

A USB connector comprises a power source VBUS line, a data D+ line and a data D− line, a reference potential GND line and an ID line. The ID line is used to identify a dual role device as a "USB host" or a "USB device". A dual role device is a device that operates in compliance with the USB-OTG specification (On-The-Go Supplement to the USB 2.0 Specification) and may be determined to be operating as a "USB host" or as a "USB device" depending upon the voltage level detected in the ID line.

Power supply between devices connected through a USB connection is normally executed through the VBUS line. In addition, the devices connected through the USB connection communicate with each other through serial communication via a pair of data lines, i.e. the D+ line and the D− line.

The USB device 10 in FIG. 1 includes a control unit 12, a device controller 13, a transistor 14, a resistor 15, a diode 16 and a connector RC 11, with a battery 11 loaded therein. It is to be noted that an explanation of the structural blocks in the USB device 10 engaged in photographing processing executed in the camera (the imaging optical system, the imaging sensor, the image processing unit, the memory, the operation member, the recording medium and the like) is not provided in this specification.

Power is supplied from the battery 11 to the various blocks constituting the USB device 10, such as the control unit 12 and the device controller 13. The control unit 12 includes a microcomputer and controls the operations of the various blocks in the USB device 10 (an electronic camera in this example). In response to an instruction from the control unit 12, the device controller 13 executes control so as to enable the USB device 10 to operate as the "USB device". Data communication between the USB device 10 and the USB host 50 is controlled by a host controller 51 to be detailed later. The USB device 10 cannot transmit data to the USB host 50 unless the USB host 50 grants a bus utilization authorization to the USB device 10.

The ON/OFF state of the transistor 14 is controlled in response to an instruction from the control unit 12. As the transistor 14 enters an ON state, the power from the battery 11 is supplied to an ID pin of the connector RC 11 via the transistor 14 and the diode 16. A switching element such as an analogue switch or a relay may be used in place of the transistor 14. The diode 16 is disposed for purposes of preventing a reverse current flow. The resistor 15 is provided so as to set the potential at the base terminal of the transistor 14 to a predetermined level.

The USB connectors used in the embodiment include the connector RC 11 at the USB device 10 and a connector PL 21 at the USB host 50. The connector RC 11 is a mini B-type receptacle (mini-B receptacle). A mini B-type receptacle is a connector dedicated to the "USB device". A mini B-type plug (mini-B plug) at the "USB host" or a "USB cable" can be plugged into the connector RC 11. In the embodiment, the mini B-type plug (mini-B plug) at the USB host is connected to the connector RC 11. The connector RC 11 includes a VBUS pin corresponding to the VBUS line, a D+ pin corresponding to the D+ line, a D− pin corresponding to the D− line, a GND pin corresponding to the GND line and the ID pin corresponding to the ID line.

The USB host 50 includes a control unit 52, the host controller 51 and the connector PL 21. It is to be noted that the figure does not include an illustration of the blocks engaged in wireless communication processing in the USB host 50. The USB host 50 does not have a power source and instead, it receives power supplied from the USB device 10 and delivers it to the host controller 51 and the control unit 52.

The control unit 52 includes a microcomputer and controls the operations of the various blocks in the USB host 50 (a wireless LAN module in this example). In response to an instruction from the control unit 52, the host controller 51 executes control so as to enable the USB host 50 to operate as the "USB host". Any processing via the bus is invariably triggered by the USB host 50 under control executed by the host controller 51.

The connector PL 21 is a mini B-type plug (mini-B plug) A mini B-type plug is a connector dedicated to the "USB host". The mini B-type receptacle (mini-B receptacle) at the "USB device" i.e., the connector RC 11 is connected to the connector PL 21. The connector PL 21 includes a VBUS pin corresponding to the VBUS line, a D+ pin corresponding to the D+ line, a D− pin corresponding to the D− line, a GND pin corresponding to the GND line and an ID pin corresponding to the ID line. It is to be noted that the VBUS pin and the ID pin-are connected with each other within the USB host 50.

The USB device 10 and the USB host 50 described above are utilized through the following procedure.

(Procedural step 1) The USB device 10 and the USB host 50 become connected with each other via the connector RC 11 and the connector PL 21.

(Procedural step 2) At the USB device 10, a wireless LAN module use/nonuse setting is selected through, for instance, a menu operation performed by using the operation member. As the use of the wireless LAN module becomes allowed, the control unit 12 at the USB device 10 turns on the transistor 14 by setting the base terminal at the transistor 14 to L level. As a result, power from the battery 11 is supplied from the USB device 10 to the USB host 50 through the ID line.

If the wireless LAN module use setting is not selected, i.e., if the use of the wireless LAN module is not allowed, the control unit 12 at the USB device 10 sets the base terminal at the transistor 14 to H level, thereby turning off the transistor 14. In this situation, the USB device 10 does not supply the power from the battery 11 to the USB host 50.

The following advantages are achieved in the first embodiment described above.

(1) Since the power supply from the USB device 10 to the USB host 50 can be switched on/off, the power supply can be stopped on demand.

(2) Power can be supplied from the USB device 10 to the USB host 50 without having to constitute the USB device 10 as a dual role device, ie., without having to install a controller or software in compliance with the USB-OTG specification (USB On-The-Go Supplement to the USB 2.0 Specification) standard in the USB device. As a result, an inexpensive interface system is realized.

(3) Even if a USB cable in compliance with the USB-OTG is connected to the connector RC 11 of the USB device 10, the power output from the ID pin of the USB device 10 is never short-circuited through the USB cable. At the standard USB cable in compliance with the USB-OTG, the ID pin of the mini-B plug to the "USB device" is open-circuited (unconnected) and the ID pin of the mini-A plug to the "USB host" is short-circuited (connected) with the GND pin. Accordingly, when the mini-B plug of the USB cable in compliance with the USB-OTG is connected with the connector RC 11 (mini-B receptacle) of the USB device 10, the power output through the ID pin of the connector RC 11 is never shorted through the USB cable, assuring a safety.

Figure 2:
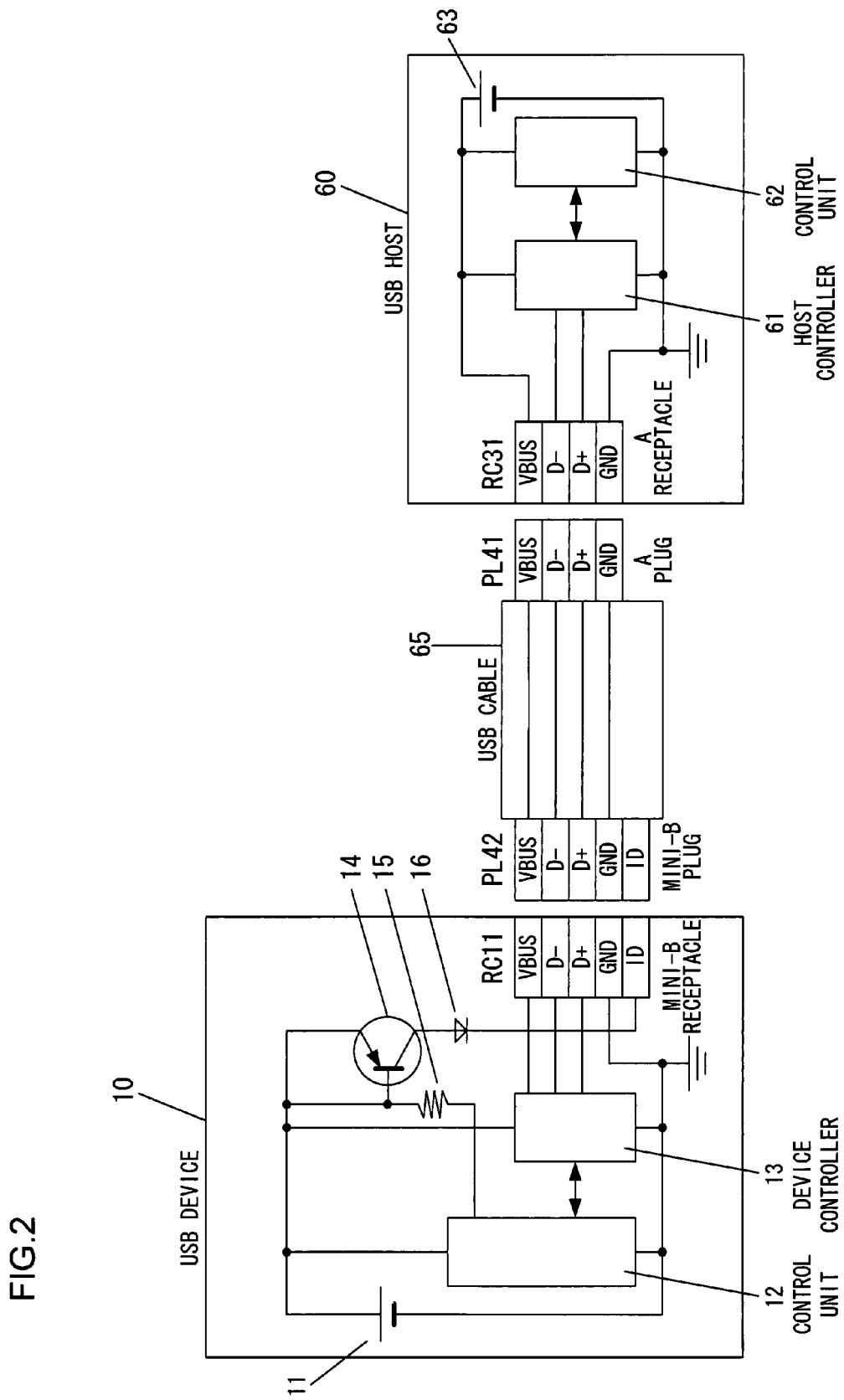
FIG. 2 shows a USB device and a USB host that supplies power to the USB device, connected with each other via a USB cable.

FIG. 2 illustrates another connection example. FIG. 2 shows a USB device 10 and a USB host 60 connected with each other via a USB cable 65. The USB host 60 in FIG. 2 has a function of supplying power to a "USB device".

Since the USB device 10 is similar to that shown in FIG. 1, its explanation is omitted. It is to be noted that FIG. 2 does not provide an illustration of the blocks engaged in the photographing processing executed in the camera. The USB cable 65 is a directional cable. A connector PL 42 disposed at one end of the USB cable 65 is a mini B-type plug (mini-B plug). The mini B-type plug is a connector to the "USB device". The mini B-type receptacle (mini-B receptacle) of the "USB device", i.e., the connector RC 11, is connected to the connector PL 42.

A connector PL 41, disposed at the other end of the USB cable 65, is an A-type plug (A plug). The A-type plug is a connector to the "USB host". An A-type receptacle (A receptacle) of the "USB host", i.e., a connector RC 31, is connected to the connector PL 41. Since the connectors disposed at the two ends of the USB cable 65 assume different shapes, two "USB hosts" or two "USB devices" are never connected with each other by mistake.

The connector PL 41 is a full-size connector with four pins. The connector PL 42 is a mini-type connector such as that explained earlier and includes five pins. Since the connector PL 41 does not include an ID pin, the USB cable 65 does not include a wiring for ID pin connection and the ID pin of the connector PL 42 is left open-circuited (unconnected).

The USB host 60 includes a control unit 62, a host controller 61 and the connector RC 31 (A-type receptacle), with a battery 63 loaded therein. It is to be noted that an illustration of the structural blocks in the USB host 60 engaged in wireless communication processing is not provided. The USB host 60 supplies power from the battery 63 to the host controller 61 and the control unit 62.

The control unit 62 includes a microcomputer and controls the operations of the various blocks in the USB host 60 (a wireless LAN module in this example). In response to an instruction from the control unit 62, the host controller 61 executes control so as to enable the USB host 60 to operate as the "USB host". Any processing via the bus is invariably triggered by the USB host 60 under control executed by the host controller 61.

The connector RC 31 is an A-type receptacle (A receptacle). An A receptacle is a connector dedicated to the "USB host". The connector PL 41 (A plug) of the USB cable 65 is connected to the connector RC 31. The connector RC 31 includes a VBUS pin corresponding to the VBUS line, a D+ pin corresponding to the D+ line, a D− pin corresponding to the D− line and a GND pin corresponding to the GND line. It is to be noted that the VBUS terminal is connected with the power line (the positive pole side of the battery 63) within the USB host 60.

The structure shown in FIG. 2 allows the USB device 10 to judge whether or not the USB host 60 is connected to the USB device 10 simply by checking the voltage at the VBUS pin. In addition, the USB device 10 is able to engage in operation on the power provided therein (from the battery 11) without having to rely on power supplied from the "USB host" via the VBUS line.

Figure 3:
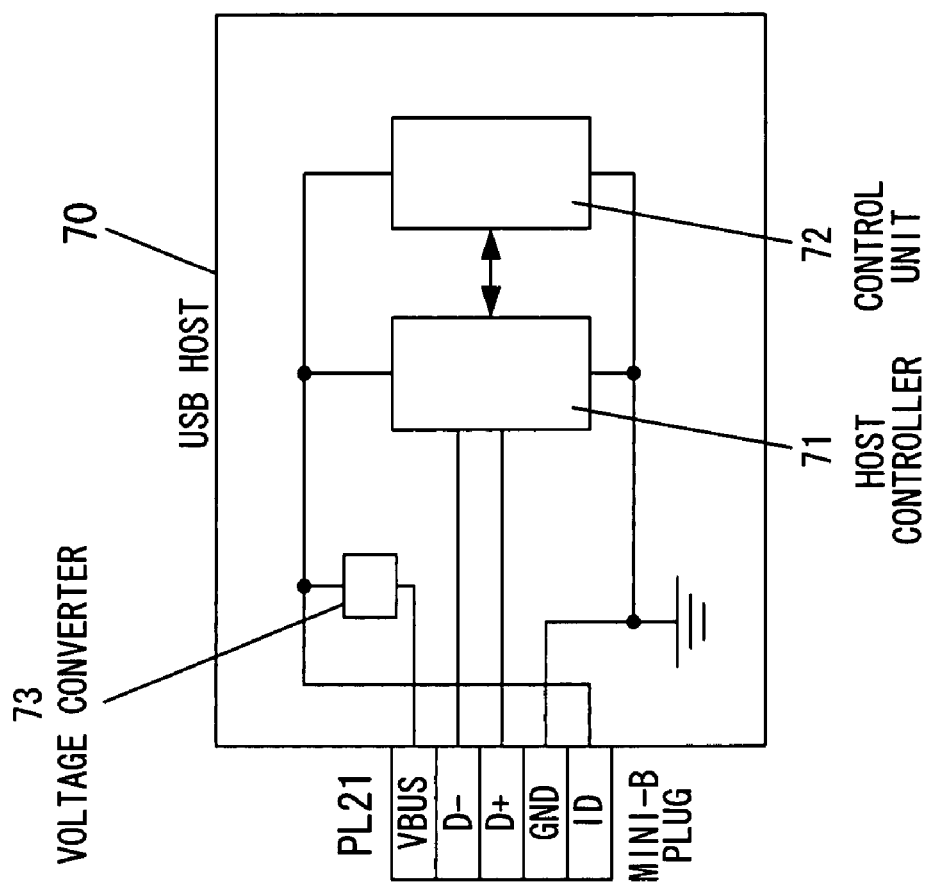
FIG. 3 shows the USB host achieved in a second embodiment.

FIG. 3 shows a USB host 70 achieved in the second embodiment. The USB host 70 includes a control unit 72, a host controller 71, a voltage converter 73 and a connector PL 21. It is to be noted that the figure does not include an illustration of the blocks engaged in wireless communication processing in the USB host 70. The USB host 70 receives power supplied from the USB device 10 and then delivers the power thus received to the host controller 71 and the control unit 72.

The control unit 72 includes a microcomputer and controls the operations of the various blocks in the USB host 70 (a wireless LAN module in this example). In response to an instruction from the control unit 72, the host controller 71 executes control so as to enable the USB host 70 to operate as the "USB host". Any processing via the bus is invariably triggered by the USB host 70 under control executed by the host controller 71.

The connector PL 21 (mini-B plug) is identical to the connector assigned with the same reference numeral in FIG. 1 and, accordingly, its explanation is omitted. The voltage converter 73 converts the voltage (e.g., DC 12 V) received via the ID terminal of the connector PL 21 to a voltage at a predetermined level (e.g., DC 5V), and supplies the voltage resulting from the conversion to the VBUS pin of the connector PL 21. The voltage converter 73 may be constituted with, for instance, a voltage regulator, a transformer, a DC/DC converter or the like.

In the second embodiment described above, the USB host 70 includes the voltage converter 73 so as to first convert the voltage received from the USB device 10 and then supply the voltage resulting from the conversion to the VBUS pin of the USB device 10. This structure allows the present invention to be adopted even when the USB device 10 and the USB host 70 operate on different voltages.

While the voltage is lowered via the converter 73 in the example explained above, the voltage may instead be boosted via the voltage converter for the adoption of the present invention.

The present invention may be adopted in a structure that includes a voltage converter through which the voltage to be supplied to the host controller 71 (or the control unit 72) is converted.

While an explanation is given above on an example in which the USB device 10 is constituted with an electronic camera, the present invention is not limited to this example and it may be adopted in conjunction with a USB device constituted with a portable electronic device such as a portable telephone or a PDA.

While the USB host 50 in the description provided above is a wireless LAN module, the present invention may be adopted in conjunction with a USB host constituted with a tuner module, a GPS reception unit module or the like, instead.

The above described embodiments are examples, and various modifications can be made without departing from the scope of the invention.

What is claimed is:

1. An electronic device, comprising:
   a USB device controller;
   a USB connector through which a specific other electronic device equipped with a USB host controller is connected to the electronic device, the USB connector including at least a specified pin and a power supply pin; and
   a power supply circuit that supplies power from a power source to the specific other electronic device equipped with the USB host controller via the specified pin, the specified pin being assigned to a first process in a USB specification other than the power supply pin, the power supply pin being assigned to a second process in the USB specification of the USB connector if the specific electronic device equipped with the USB host controller is connected to the electronic device, the first process in the USB specification via the specified pin being different from the second process via the power supply pin.

2. An electronic device according to claim 1, wherein:
the specified pin is an identifier pin of the USB connector; and
the power supply circuit supplies power to the specific electronic device equipped with the USB host controller via the identifier pin.

3. An electronic device according to claim 2, wherein:
the power supply circuit includes a switching device that connects the power source with the identifier pin and disconnects the power supply from the identifier pin.

4. An electronic device according to claim 3, further comprising:
a control unit that issues a switch instruction to the switching device.

5. An electronic device according to claim 4, further comprising:
an operation member that enable a menu operation to be performed to select a use/nonuse setting for the specific electronic device equipped with the USB host controller connected via the USB connector, wherein:
the control unit issues the switch instruction to the switching device once use of the specific electronic device equipped with the USB host controller is allowed through the menu operation performed via the operation member.

6. An interface system, comprising:
a first electronic device according to claim 1; and
a second electronic device, comprising:
a different USB host controller;
a different USB connector through which the first electronic device is connected to the second electronic device; and
a different power supply circuit to which power is supplied from the first electronic device via a different specified pin, the different specified pin assigned to the first process in a USB specification other than a different power supply pin, the different power supply pin being assigned to the second process in the USB specification if the specific electronic device equipped with the USB host controller is connected to the electronic device, the first process in the USB specification via the specified pin being different from the second process via the power supply pin.

7. A USB interface system according to claim 6, wherein:
the first electronic device is an electronic camera, equipped with blocks engaged in photographing processing including an imaging optical system, an imaging sensor that captures an image of a subject, an image processing unit that executes image processing on an imaging signal output from the imaging sensor, a memory, an operation member and a recording medium; and
the second electronic device is a wireless LAN module.

8. An electronic device, comprising:
a USB host controller;
a USB connector through which a specific electronic device equipped with a USB device controller is connected to the electronic device, the USB connector including at least a specified pin and a power supply pin; and
a power supply circuit to which power is supplied from the specific other electronic device equipped with the USB device controller via the specified pin, the specified pin being assigned to a first process in a USB specification other than the power supply pin, the power supply pin being assigned to a second process in the USB specification if the specific electronic device equipped with the USB host controller is connected to the electronic device, the first process in the USB specification via the specified pin being different from the second process via the power supply pin.

9. An electronic device according to claim 8, wherein:
the specified pin is an identifier pin of the USB connector; and
power is supplied to the power supply circuit via the identifier pin.

10. An electronic device according to claim 9, wherein:
the identifier pin and the power supply pin are connected with each other.

11. An electronic device according to claim 9, wherein:
the power supply circuit includes a voltage converter that lowers or boosts a voltage supplied via the identifier pin; and
the voltage resulting from conversion at the voltage converter is applied to the power supply pin.

* * * * *